(12) United States Patent
Lowthert et al.

(10) Patent No.: US 7,263,714 B2
(45) Date of Patent: Aug. 28, 2007

(54) PROVIDING CONTENT INTERRUPTIONS

(75) Inventors: Jonathan E. Lowthert, Sunnyvale, CA (US); Oleg B. Rashkovskiy, Cupertino, CA (US)

(73) Assignee: BlackArrow, Inc., San Mateo, CA (US)

( * ) Notice: Subject to any disclaimer, the term of this patent is extended or adjusted under 35 U.S.C. 154(b) by 920 days.

(21) Appl. No.: 09/764,748

(22) Filed: Jan. 18, 2001

(65) Prior Publication Data

US 2002/0095674 A1 Jul. 18, 2002

(51) Int. Cl.
*H04N 7/10* (2006.01)
*H04N 7/16* (2006.01)

(52) U.S. Cl. .......................... 725/139; 725/32; 725/92; 725/93; 725/151

(58) Field of Classification Search ............... 725/32, 725/34–36, 37–44, 88–90, 102, 92, 93, 139, 725/151; 386/46, 125, 126, 124
See application file for complete search history.

(56) References Cited

U.S. PATENT DOCUMENTS

| 5,586,264 | A | * | 12/1996 | Belknap et al. ............. 725/115 |
| 5,724,521 | A | * | 3/1998 | Dedrick ....................... 705/26 |
| 5,774,170 | A | * | 6/1998 | Hite et al. .................... 725/34 |
| 5,948,061 | A |   | 9/1999 | Merriman et al. .......... 709/219 |
| 6,357,042 | B2 | * | 3/2002 | Srinivasan et al. ........... 725/32 |
| 6,698,020 | B1 | * | 2/2004 | Zigmond et al. ............. 725/34 |
| 6,769,127 | B1 | * | 7/2004 | Bonomi et al. ............... 725/39 |
| 6,961,430 | B1 | * | 11/2005 | Gaske et al. ................. 380/216 |
| 6,971,119 | B1 | * | 11/2005 | Arsenault et al. ............. 725/89 |
| 2001/0042249 | A1 |  | 11/2001 | Knepper et al. .............. 725/42 |

OTHER PUBLICATIONS

Oleg B. Rashkovskiy, U.S. Appl. No. 09/690,159, filed Oct. 17, 2000, entitled "Providing Content Interruptions".
Oleg B. Rashkovskiy, U.S. Appl. No. 09/561,443, filed Apr. 28, 2000, entitled "Providing Content Interruptions".
Jonathan Lowthert et al., U.S. Appl. No. 09/765,246, filed Jan. 18, 2001, "Providing Content Interruptions".

* cited by examiner

*Primary Examiner*—Kieu-Oanh Bui
(74) *Attorney, Agent, or Firm*—Trop, Pruner & Hu, P.C.

(57) ABSTRACT

Content which users may wish to receive may be distributed with interrupting content such that the use of the content on the user's receiver may be interrupted and replaced with the interrupting content. The content which the user wishes to receive may be software, audio, video, graphics or other material and the interrupting content in one embodiment of the prevent invention may be advertisements. In this way, the user's receiver may be utilized to determine when it is appropriate to interrupt the interruptible content with the interrupting content. This may provide a convenient mechanism for reduced price or free distribution of a wide variety of media currently provided only in physical form or only for free without any compensation to the content provider.

31 Claims, 6 Drawing Sheets

PROVIDING CONTENT INTERRUPTIONS

BACKGROUND

This invention relates generally to content distribution.

Broadband content distribution may involve the distribution of television programming to a large number of receivers as well as the distribution of other forms of content. Content which may be amenable to widespread distribution include video, graphics, software, audio and games.

The ability to charge customers for content in many cases means that the type of content that may be distributed may be of higher quality. Thus, pay-per-view television programming is widely accepted.

However, there is a considerable demand for the distribution of content without charge. Conventional television broadcasts subsidize distribution through an advertising scenario. Similarly, in connection with the Internet, a large amount of content is distributed for free with the hope that viewers will patronize advertisers that pay for banner ads that accompany the content.

Thus, it would be desirable to include advertising material or other interruptions in the course of a wide variety of content that might be distributed for free or at reduced charge in a broadband distribution network. However, many content formats are not amenable to the ready incorporation of advertising material. For example, games and software could be distributed with banner ads. However, full screen display of advertisements is generally not viable because there is no way to know when to insert these advertisements in the course of the video game or software operation.

An interruptible content delivery system allows the play of any of a variety of types of selectable content to be paused to permit the automatic insertion of advertising material. Thus, the play of audio, video, games, graphics, software or other media may be paused automatically to allow insertion of advertisements. At the end of the advertisement, the content restarts where it left off.

Generally, advertisers prefer to target their advertisements to specific demographic profiles. For example, advertisers may attempt to target a specific demographic profile based on the nature of a particular type of content such as the nature of the television program. The advertisers may determine that people who enjoy particular types of content, such as particular television programs, may be more likely to purchase particular types of products.

Of course in some potential interruptible content delivery systems, it may not be known in advance what content may be played at any given time. Instead, in many situations, the user may be in control of selecting the content that is played at any particular time.

Thus, there is a need for ways to enable advertising to be inserted in an interruptible content delivery system.

DETAILED DESCRIPTION

Figure 1:
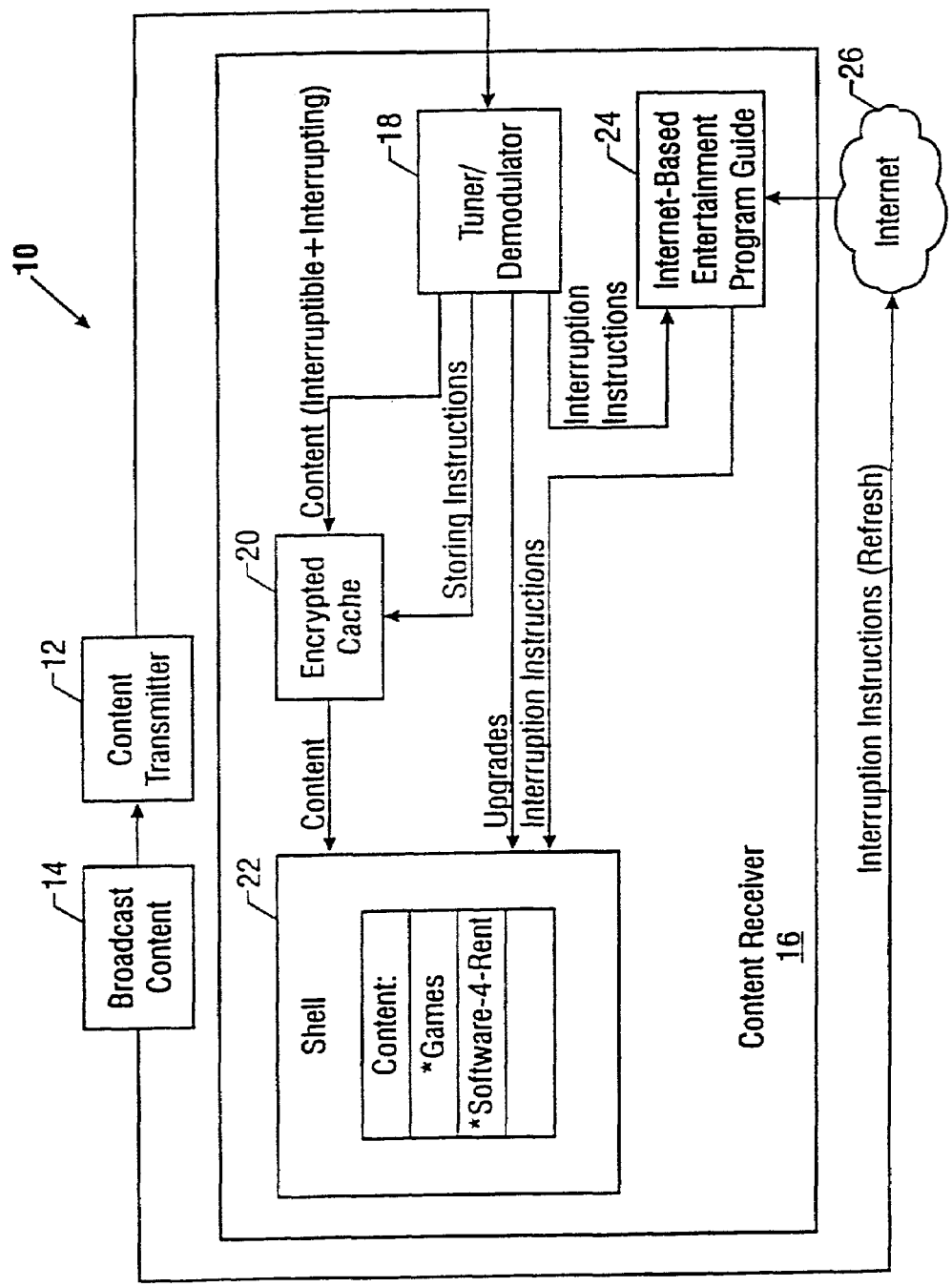
FIG. 1 is a schematic depiction of a broadband digital distribution system in accordance with one embodiment of the present invention.

A digital broadband distribution network 10, shown in FIG. 1, may implement the distribution of a variety of content formats and the provision of content interruptions on a content receiver 16. The content receiver 16 receives content from a content transmitter 12 that in turn receives broadcast content from a content provider 14.

The content transmitted by the transmitter 12 may be made up of conventional content termed "interruptible content" and "interrupting content". Interruptible content is content whose operation, play, or use may be interrupted for the substitution of other content. The content that is temporarily substituted for the interruptible content is called the interrupting content.

In accordance with one embodiment, interruptible content that the user desires to receive may be interrupted with interrupting content that may help to pay for the interruptible content. The interrupting content may include advertisements.

The interruptible content may be video, graphics, audio, games, and other software such as application software. The interrupting content may be substituted for the interruptible content under control of the receiver 16 in one embodiment.

The content from the content transmitter 12 is received by a tuner/demodulator 18 contained in the digital content receiver 16. The tuner/demodulator 18 tunes to one or more channels and demodulates those channels for display. In addition, the tuner/demodulator 18 may parse the interruptible and interrupting content and forward that information to an encrypted cache 20. The tuner/demodulator 18 also parses storing instructions utilized for controlling the storage of the content. The storing instructions are also forwarded to the encrypted cache 20 for use in storing the content. In addition, the tuner/demodulator 18 may parse upgrades, provided with the content, for upgrading previously received content. Finally the tuner/demodulator 18 may parse interruption instructions from the rest of the content. These interruption instructions tell when to interrupt the interruptible content with the interrupting content. The interruption instructions may be forwarded to a program guide 24.

The program guide 24 may receive interruption instructions from a back channel that may be coupled to the broadcast content provider 14. The interruption instructions may be conveyed, for example, over the Internet as indicated at 26. In some cases, the interruption instructions may be updated, revised or extended and therefore it may be necessary to convey them after the original content is received.

The program guide 24 may provide a schedule of available information that may be received from the content provider 14. This information may be accessed over the backchannel such as the Internet 26 to reduce the storage requirements on the content receiver 16. The interruption instructions, received over the back channel or as parsed by the tuner/demodulator 18, may be forwarded by the content guide 24 to a shell 22. The shell 22 in one embodiment of the present invention may be a software module that controls the use of content received from the broadcast content provider 14. Moreover, the shell 22 implements the interruption of interruptible content with interrupting content in accordance with interruption instructions received as described previously.

The encrypted cache 20 stores the content in a format that prevents decryption and theft by unauthorized individuals. The encrypted cache 20 may, for example, be part of a hard disk drive. When content is received by the system 10, the shell 22 stores the information on the hard disk drive and particularly in the encrypted cache. For example, the shell 22 may cause the content to be distributed to a variety of storage locations on the hard disk drive so that the content may not be continuously accessed in one contiguous hard drive area. Only the shell 22 can access the map that indicates where the content is stored on the hard disk drive and how it can be reconstructed to play back the content in a meaningful fashion.

Thus, as content is acquired from a source and stored through the shell into the hard disk drive, it is stored in a form that can only be accessed by the shell thereafter. To access the content one must access the content through the shell because only the shell knows where all the portions of the content are stored and how to reconstruct it in a meaningful fashion. Thus, the shell can control access in a variety of ways. For example, the shell can prevent access, the shell can provide access only in return for either watching a commercial or paying a fee or the shell may limit the number of times that the content may be viewed or even the times when the content may be viewed.

Thus, in the embodiment illustrated in FIG. 1, the shell 22 may have content, such as games or rentable software as a few examples. When the user wishes to use the content that is available from the content provider 14, the user may request a download of that information or that information may be conveyed during conditions of high bandwidth availability. Alternatively, other schemes for providing the content to the receiver 16 may be utilized. In general, the transport mechanism may include any digital mechanism such as satellite transmission, cable transmission or airwave broadcast.

Conceivably, the content may also be provided in conventional physical, portable forms such as compact disks (CD-ROM), digital video disks (DVD), flash memory or the like. The content, however received, is encoded in a way in which, absent the use of the shell 22, one would be unable to use, hear, view, play or otherwise enjoy the content. Thus, the system controls access to the content in a secure way using encryption provided with the content as conveyed over the transport media or as received in physical form by the user.

Once the information has been cached in the cache 20, the user can receive the right to enjoy, play, hear or view the content as the case may be from the shell 22. The shell 22 then releases the information for use in the appropriate format on the processor-based content receiver 16. The shell 22 may also control the number of times or the time period when the content may be used.

Moreover, the shell 22 monitors a criteria which determines when the content's use is to be interrupted with interrupting content. Thus, the shell 22 may force a mechanism wherein interrupting content may be temporarily played in place of interruptible content. For example, advertisements may be provided together with the interruptible content. Alternatively, the interrupting and interruptible content may be received at different times via different mechanisms.

For example, the interrupting content may be inserted at regular intervals. After allowing content to be played for a predetermined amount of time, interrupting content may be inserted automatically. In other cases, the interrupting content may be inserted when advantageous conditions arise.

For example, in connection with gaming software, when the user reaches a stopping point, the system may determine that the action has paused sufficiently that the interrupting content may be inserted. Moreover, instead of linearly inserting the interrupting content, the content may be inserted in a progressive fashion. Thus, the more the user uses the content the higher the rate at which interrupting content may be substituted.

In one embodiment of the present invention, the content that is being played may be interrupted with the play of the commercial in real time. That is, when the commercial is broadcast over a broadcast media, it may automatically be inserted into the playback of the content on the system 10 as well.

In one embodiment of the present invention, the interruptible content may be an advertisement; however, the interrupting content may also be a request that the user make some form of payment in order to continue to use the interruptible content. For example, the receiver 16 may be called upon to access backchannel to make a payment for the continued use of the content. When the receiver 16 does so, the receiver 16 may be provided with a code either through the back channel or from the content provider which allows continued use of the interruptible content.

In some embodiments of the present invention, techniques may be utilized to reduce the likelihood that users of the system 10 will discontinue their use when the commercial is played. For example, an overlay may be provided over the commercial to indicate what is coming up next in the content. For example, where the content is a game and the commercial is inserted after the user reaches a given level, information may be provided about the next level as an overlay, for example, over the ongoing play of the commercial.

Figure 2:
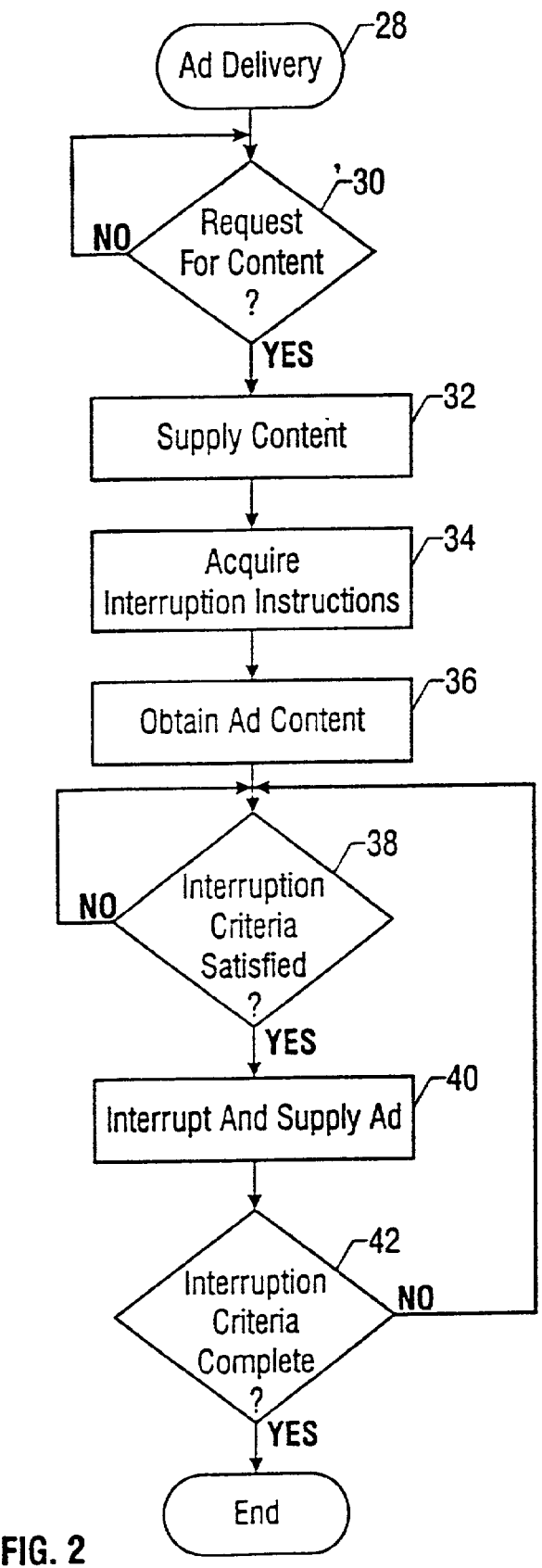
FIG. 2 is a flow chart for software that may be utilized on a receiver in the system shown in FIG. 1.

Referring to FIG. 2, the software 28 for controlling the interruption of the interruptible content may be stored on a suitable storage medium such as a hard disk drive on the receiver 16. Initially, the software 28 waits for a request for content as indicated in diamond 30. Once such a request is received, the content may be supplied as indicated in block 32. In the same process, interruption instructions may be acquired as indicated in block 34 for the content that was requested and supplied in block 32. In addition, interrupting content may then be obtained as indicated in block 36. When an interruption criteria is satisfied, as determined in diamond 38, the ongoing use of the interruptible content may be interrupted as indicated in block 40. Thus, in one embodiment of the present invention, the interruptible content is interrupted upon satisfaction of an interruption criteria. The interrupting content, such as an advertisement, is substituted temporarily.

A check at diamond 42 then determines whether the interrupted criteria is complete. If not, the flow recycles to continue to check to determine whether the interruption criteria is satisfied at diamond 38. Otherwise, the flow ends.

Figure 3:
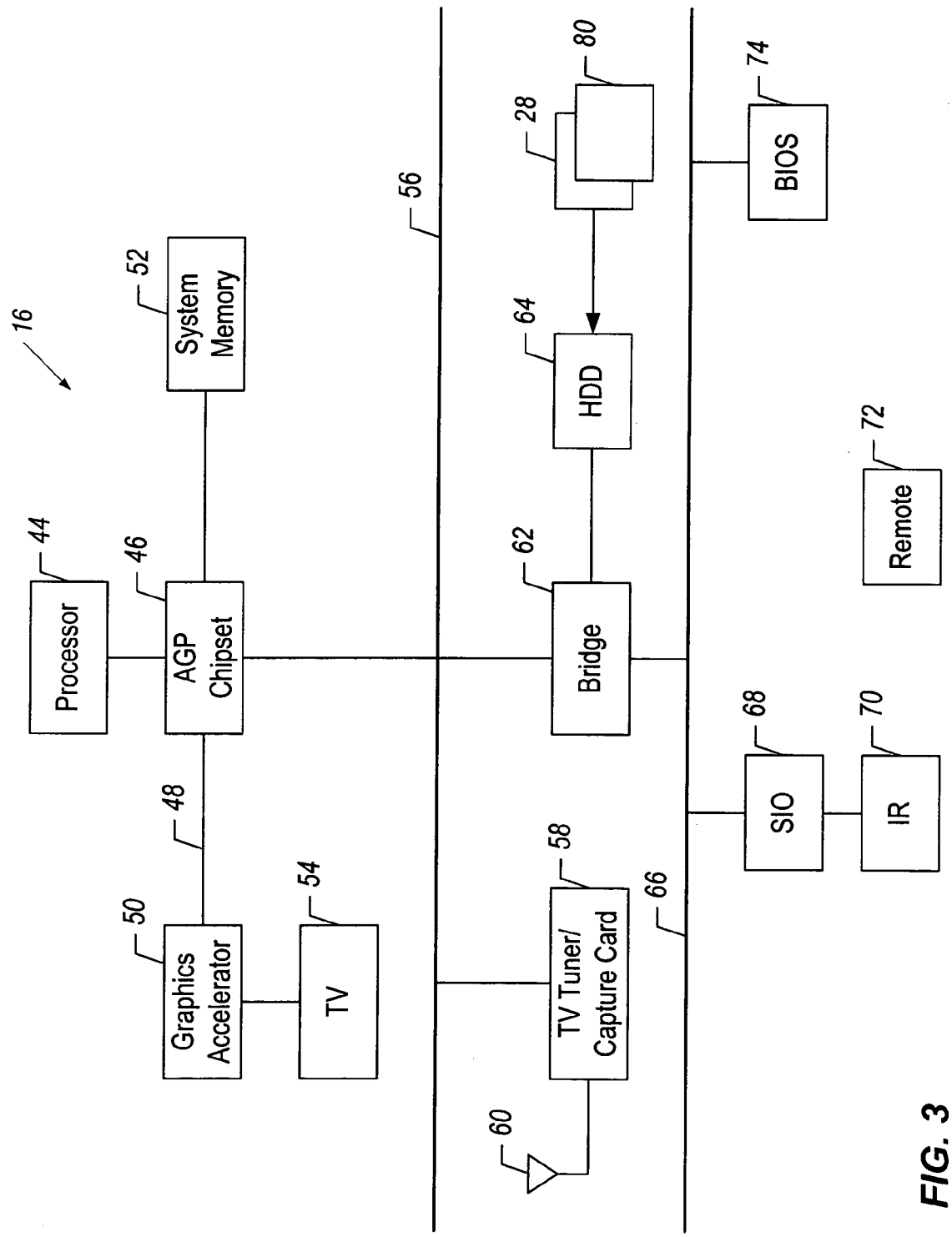
FIG. 3 is a block depiction of a receiver in accordance with one embodiment of the present invention.

A processor-based content receiver 16 in accordance with one embodiment of the present invention shown in FIG. 3, may be a set top box, a desk top computer, an appliance, a handheld device, or other form factors. The receiver 16 may include a processor 44. In one embodiment, the processor 44 may be coupled to an accelerated graphics port (AGP) chipset 46 for implementing an accelerated graphics port embodiment. The chipset 46 communicates with the system memory 52, the AGP port 48 and the graphics accelerator 50. A television 54 may be coupled to the video output of the graphics accelerator 50. The chipset 46 is also coupled to a bus 56 that may be, for example, a Peripheral Component Interconnect bus (PCI) bus. See revision 2.1 of the PCI Electrical Specification available from the PCI Special Interest Group, Portland, Oreg. 97214. The bus 56 connects to a TV tuner/capture card 58 that provides tuning and demodulation for receiving the digital signal. The card 58 may be coupled an antenna 60 or other source of digital video such as a cable input, a satellite receiver or the like.

The bus 56 is also coupled to a bridge 62 that couples the hard disk drive 64 that may store the software 28 and 80 in one embodiment of the present invention. The bridge 62 is also coupled to another bus 66 that may be coupled to a serial input/output (SIO) device 68. In one embodiment of the present invention, the device 68 is in turn coupled to an interface 70 that may be an infrared interface. The interface 70 communicates with a remote control unit 72. Also connected to the bus 66 is a basic input/output system (BIOS) 74.

In some cases, a large amount of content may eventually be downloaded or otherwise acquired and stored in a storage medium associated with the system 10. For example, in conventional systems, the storage medium may be a hard disk drive. Thus, it may be useful for the user to know what content has been stored on the user's hard disk drive. A file may be assembled which gives the user a content guide that lists all the content that is still available for access through the shell 22. In this way, the user can select that content by selecting one of the entries in the content guide. For example, the entries in the content guide may be selected by mouse clicking on them causing the content to immediately begin play.

While a digital receiving system has been described above, the present application is equally applicable to analog systems such as analog television receivers that work with set-top boxes. In such case, storing instructions may be provided over the vertical blanking interval in one embodiment of the present invention. Alternatively, storing instructions may be received over the Internet or through some other source.

In another alternate embodiment, interruption instructions, interrupting content and interruptible content may be received over the Internet 26. In such case, the content may be forwarded through the program guide 24 and directly to the encrypted cache 20. As a result, the content bypasses the tuner/demodulator 18 but still ends up being stored in the encrypted cache 20 as described previously. That information may then be accessed through the shell 22 in the same way as information stored in the encrypted cache 20 via the tuner/demodulator 18. The interruption instructions may be sent through the program guide 24 to the shell 22.

Figure 4:
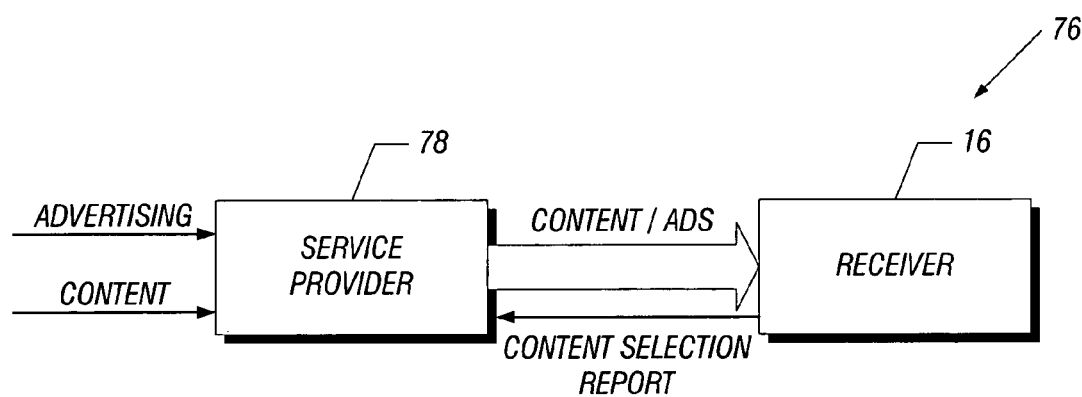
FIG. 4 is a schematic depiction of a system for allocating credit for content played in connection with advertisements.

Referring to FIG. 4, a system 76, for allocating credit for content played in connection with advertising inserted, may use a service provider 78 that provides content and advertising over an appropriate medium to a client 16. The medium may be the Internet or a magnetic disk or a television broadcast, as a few examples.

For example, in one embodiment, the service provider 78 may be connected to the client receiver 16 over a cable or a satellite distribution network. The service provider 78 may receive advertising material together with content from a variety of providers and may provide that content according to an on-demand system or on a predetermined schedule to the client receiver 16. The client receiver 16 may select the advertising to insert in association with the play of content.

Again, the content may be any of a variety of electronic content forms including software, television, music, games and movies as examples. The client receiver 16 may utilize the receiver 16 described previously to insert the advertising into the content. The service provider 78 may provide the content and advertising or may merely provide an allocation function. The service provider 78 may allocate credit to content providers that provided content that was selected by the client receiver 16 for play in association with particular advertisements.

In one embodiment, the client receiver 16 has a wide variety of sources of content, which the client receiver 16 can select at any time. In the course of that content, advertising is inserted. Thus, the advertiser may accrue a charge, which is due to the content provider whose content was selected. The client receiver 16 may provide a content selection report to the service provider 78 in one embodiment.

Figure 5:
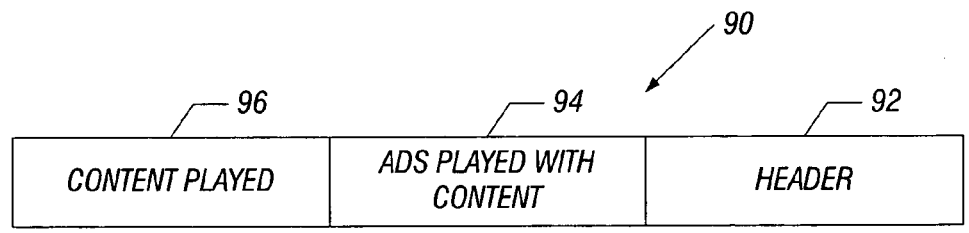
FIG. 5 is a depiction of a packet to report the selection of content associated with particular ads.

Referring to FIG. 5, the content selection report, in one embodiment, may be a packet 90 including a header 92 and fields 94 and 96 to identify the content that was played, or the content provider and the advertising that was played in juxtaposition or association with a particular content. Other forms of content selection reports may be provided. In another embodiment, the report may be provided by the client receiver 16 directly to the content provider and advertising provider.

Figure 6:
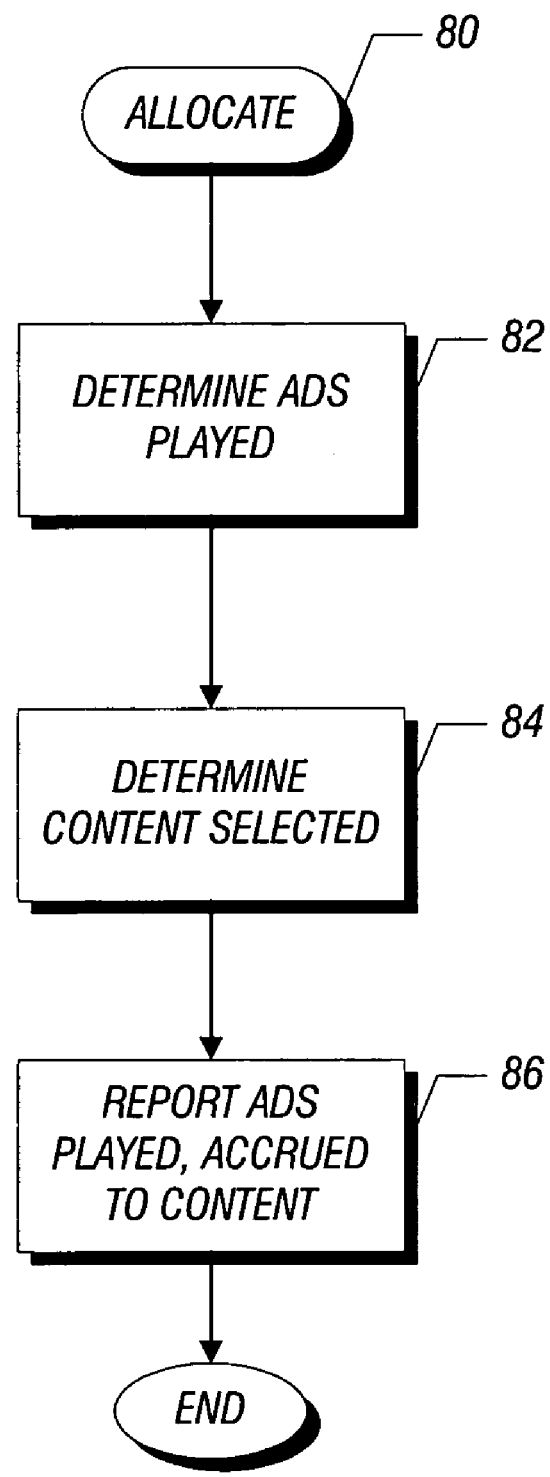
FIG. 6 is a flow chart for software in accordance with one embodiment of the present invention.

The allocation software 80 on the client receiver 16, stored in the storage device 64, may initially determine which advertisements are played as indicated in block 82 in FIG. 6. The selection of the advertisements may be in accordance with the procedures described previously. In addition, the software 80 may determine what content was selected from among the available content by a user of a particular client receiver 16 as indicated in block 84. Thus, when content is followed or proceeded by particular advertisements, that content may be associated with those advertisements. A report may be generated that accrues advertisements played to particular content providers as indicated in block 86. More particularly, charges may be assessed based on the report since the report indicates which content was played in association with particular advertisements.

Figure 7:
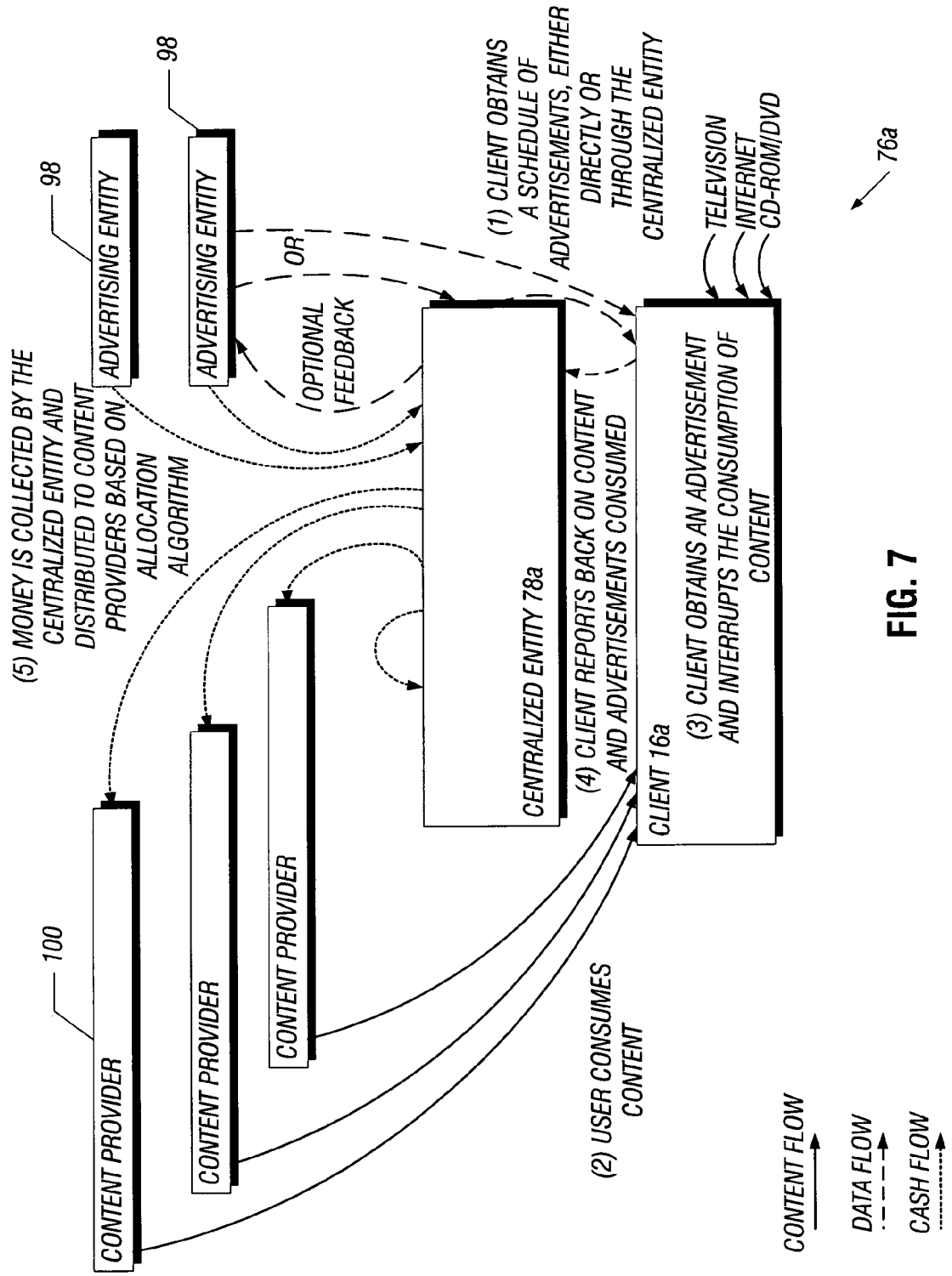
FIG. 7 is a flow chart for software in accordance with another embodiment of the present invention.

FIG. 7 is a flow chart for an embodiment of a system 76a in which the receiver 16 is implemented as a client 16a and the service provider 78 is implemented by a centralized entity 78a. Initially, the client 16a obtains a schedule of advertisements either directly from the advertisers or through the centralized entity 78a as indicated at (1) in FIG. 7. Next, the user of the client 16a uses or consumes content from content providers 100. The client 16a then obtains an advertisement and interrupts the consumption of content as indicated at (3).

The client 16a then reports back, on content and advertisements consumed, to the centralized entity 78a. In other words, the client 16a provides a report that associates content with advertising played. This report may associate an advertisement and content based on a time relationship between them. For example, all advertisements played within a given time period may be accrued to the content within that same fixed time period. Alternatively, the order of play of advertisements and content may be utilized to make such an association. In such case, for example, an advertisement inserted after content is played may be accrued to the preceding content. A number of other algorithms may apply as well.

Money may be collected by the centralized entity 78a and distributed to the content providers 100 based on the allocation algorithm. The centralized entity 78a can provide feedback about the information received from a large number of clients 16a to the content providers 100 and the advertisers 98.

In other models, the advertisers can provide the advertising directly to the client 16*a*. Alternatively, the advertiser may provide advertisements to the centralized entity 78*a* for distribution. Similarly, the content providers 100 may provide content directly to the client 16*a* or they may provide content to the client 16*a* through the centralized entity 78*a*.

In accordance with one allocation algorithm, a number of different types of content may be accessed between consecutive advertisements. The available content may be divided into music, software, movies or television as examples. The amount of time spent playing each type of content may then be determined. The revenue received from the associated advertisements may then be distributed in proportion of the amount of time each type of content was played. Alternatively, the revenue may be distributed equally from between all content providers who delivered content consumed between consecutive advertisements.

As a result, in some embodiments the advertising proceeds may be distributed in proportion to the usage of content. Thus, content providers providing content that is most often selected receive the greatest rewards.

In some embodiments, the content providers may be willing to provide the content for free because they may be compensated based on consumption. In some cases, this may attract the best content and increase the value achieved for the advertisers.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving content and an advertisement on an end-user's receiver;
   storing said content and said advertisement in a local cache coupled to said receiver;
   accessing said cached content to use the cached content in a playback mode;
   during the playback of said content, detecting a change in the access to said content from said playback mode to another mode;
   in response to said detecting, retrieving an advertisement from said cache to display said advertisement during said another mode; and
   collecting information to enable a credit to the content provider for the advertisement displayed during said another mode.

2. The method of claim 1 wherein detecting a change in the access to said content includes detecting a pause in the playback of said content.

3. The method of claim 1 wherein accessing said cached content includes receiving instructions to control the storage of said content, and controlling access to said content in accordance with said instructions.

4. The method of claim 3 wherein accessing said cached content includes receiving instructions to limit the number of times the content may be accessed for use.

5. The method of claim 1 including identifying content used on the receiver and the advertisement displayed by the receiver, and collecting information to enable a credit to a content provider for said displayed advertisement.

6. The method of claim 5 wherein identifying includes identifying content and an advertisement based on a time relationship between the used content and the displayed advertisement.

7. The method of claim 5 wherein identifying includes identifying the order in which said content was selected for use and said advertisement was displayed to determine if said advertisement and said content are to be associated.

8. The method of claim 5 including reporting, to a remote processor-based system, information to enable crediting a particular content provider based on the advertisement displayed in association with the content provider's used content item.

9. The method of claim 5 wherein collecting information includes receiving a user content selection and identifying an advertisement to associate with said content.

10. The method of claim 5 wherein collecting information includes collecting information about the frequency in which a content item is selected for use on said receiver.

11. A medium for storing instructions that, when executed, enable a processor-based system to:
    receive content and an advertisement on a receiver that is under the control of a consumer of the content;
    store said content, including an interruptible content portion, and said advertisement in a local cache coupled to said receiver, said storage to enable repetitive retrieval of said content item by said end user;
    find a place to insert said advertisement while said portion is still stored in said cache;
    identify content used on the receiver and the advertisement inserted by the receiver; and
    report, to a remote processor based system, information to credit a particular content provider based on the advertisement inserted in said content portion and output for display.

12. The medium of claim 11 further storing instructions that, when executed, enable the receiver to associate a displayed advertisement and content item based on a temporal relationship.

13. The medium of claim 12 further storing instructions that, when executed, enable the receiver to accrue a credit to the provider of content that is temporally proximate to the advertisement.

14. The medium of claim 13 further storing instructions that, when executed, enable the receiver to accrue credit to a content provider based on the amount of content selected for play on said receiver.

15. The medium of claim 14 further storing instructions that, when executed, enable the receiver to report to a remote processor-based system information about what content was played with an advertisement.

16. The medium of claim 15 further storing instructions that, when executed, enable the receiver to select an advertisement based in part on the content being played on said receiver.

17. The medium of claim 11 further storing instructions that, when executed, enable the receiver to receive a user content selection and identify an advertisement to associate with said content.

18. The medium of claim 11 further storing instructions that, when executed, enable a processor-based system to enable a variety of content to be selected for play at any time.

19. The medium of claim 11 further storing instructions that, when executed, enable a processor-based system to allow playback of content stored on said receiver according to instructions stored on said receiver.

20. The medium of claim 19 further storing instructions that, when executed, enable a processor-based system to playback content stored on said receiver according to instructions that allow access to said content only at certain times.

21. A system comprising:
- a personal-use receiver to receive content from a plurality of content providers and to receive a plurality of advertisements;
- a local cache, coupled to said receiver, to store said content, said plurality of advertisements, and instructions, said instructions to enable said receiver to detect, during play of a particular content item selected from said local cache, an interruption in the access of said particular content item from said local cache, the interruption based on a user's unique pattern of usage of the particular content item and said instructions to enable the receiver to collect information to enable a credit to the content provider that provided the particular content item for an advertisement displayed in association with said particular content item; and
- an interface, in said receiver, to insert an advertisement for display in response to detecting the interruption in the access to the particular content item.

22. The system of claim 21 wherein said system is a television receiver.

23. The system of claim 21 wherein said cache stores instructions that enable the receiver to identify an advertisement that is displayed proximate in time to the particular content item.

24. The system of claim 23 wherein said cache stores instructions that enable the receiver to accrue credit to the provider of content that is proximate to the advertisement.

25. The system of claim 24 wherein said cache stores instructions that enable the receiver to accrue credit to a content provider based upon the amount of content selected for play on the receiver.

26. The system of claim 21 wherein said cache stores instructions that enable the receiver to report to a remote processor-based system information about what content was played with which associated one or more advertisements.

27. The cache of claim 26 further storing instructions that enable the receiver to receive a user content selection and identify an advertisement to associate with the content.

28. The system of claim 21 wherein said receiver to insert the advertisement in said content in response to the detection of a pause in the playback of said content.

29. The system of claim 21 wherein said interface to allow limited access to said particular content item.

30. The system of claim 21 wherein the receiver enables a variety of different content types to be selected for play at any time.

31. The system of claim 21 wherein said receiver to prevent access to said cached content item after said interruption until play of at least one advertisement is completed.

* * * * *